United States Patent
Muramatsu et al.

[11] Patent Number: 6,154,609
[45] Date of Patent: Nov. 28, 2000

[54] LENS-FITTED PHOTOGRAPHIC FILM UNIT

[75] Inventors: Katsuji Muramatsu; Nobuyuki Kameyama, both of Kanagawa; Mitsuyoshi Mochida, Tokyo, all of Japan

[73] Assignee: Fuji Photo Film Co., Ltd., Kanagawa, Japan

[21] Appl. No.: 08/332,058

[22] Filed: Nov. 1, 1994

[30] Foreign Application Priority Data

Nov. 4, 1993 [JP] Japan ................................. 5-275610
Nov. 9, 1993 [JP] Japan ................................. 5-279869

[51] Int. Cl.[7] ............................................ G03B 17/02
[52] U.S. Cl. ......................... 396/6; 396/60; 396/379; 396/380
[58] Field of Search ........................... 354/94, 159, 795, 354/297; 396/6, 60, 379, 380

[56] References Cited

U.S. PATENT DOCUMENTS

| | | |
|---|---|---|
| 4,884,087 | 11/1989 | Mochida et al. . |
| 5,086,311 | 2/1992 | Naka et al. . |
| 5,258,790 | 11/1993 | Tanaka . |
| 5,315,331 | 5/1994 | Ohshita ........................... 354/94 |
| 5,353,076 | 10/1994 | Goddard ......................... 354/94 |
| 5,400,100 | 3/1995 | Alligood ......................... 354/159 |
| 5,410,381 | 4/1995 | Kameyama et al. ............ 354/222 |

*Primary Examiner*—Russell Adams
*Attorney, Agent, or Firm*—Young & Thompson

[57] ABSTRACT

A lens-fitted photographic film unit has a picture frame size changing mechanism for changing the size of picture frames between a full size and a panoramic size. The picture frame size changing mechanism includes upper and lower exposure aperture masking plates which are pivotally mounted in a light-shielding box in front of an exposure aperture. The masking plates are interconnected to each other through one-side contact and urged by a tension spring toward a full size position. The upper masking plate is connected to an operation knob through a crank lever and a switching lever. When the knob is operated to select the panoramic size, the switching lever is moved over a necessary amount for moving the masking plates in a panoramic size position to mask the exposure aperture. After the masking plates are stopped in the panoramic size position by stoppers, the over-stroke of the switching lever is absorbed by resilient bending of the crank lever.

16 Claims, 10 Drawing Sheets

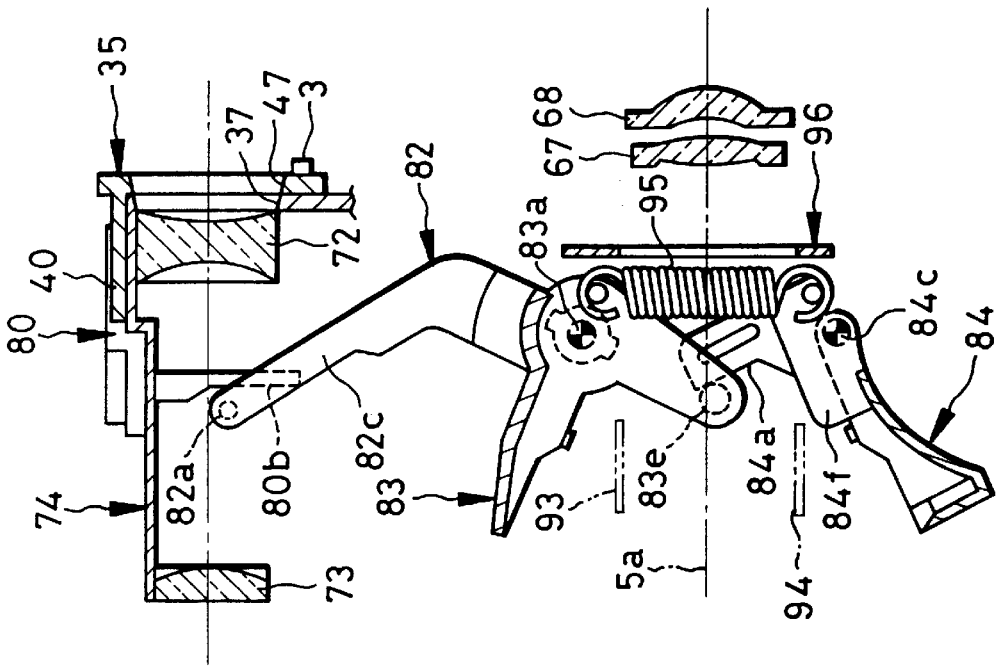
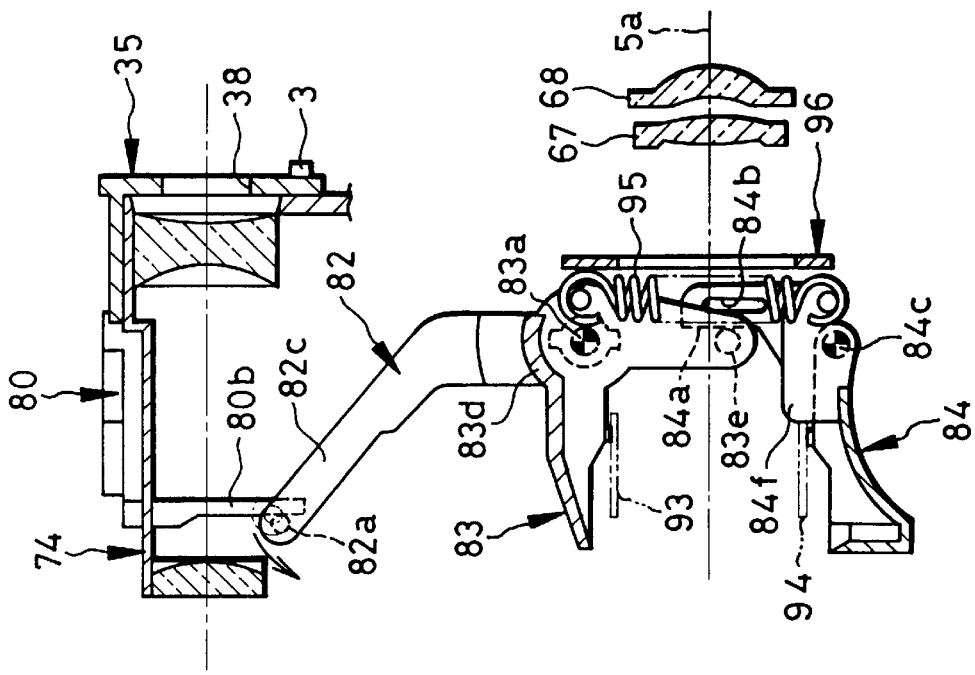

LENS-FITTED PHOTOGRAPHIC FILM UNIT

BACKGROUND OF THE INVENTION

1. Field of the Invention

The present invention relates to a lens-fitted photographic film unit with a picture frame size changing device, and more particularly to a lens-fitted photographic film unit which is changeable between a panoramic size position and a standard or full size position.

2. Related Art

Compact cameras having a picture frame size changing device are known, wherein either full size photography or panoramic photography may be practiced in a strip of photographic film, and the field of view of the view of the viewfinder is also changed to correspond to either the full size or the panoramic size photographic field.

Also a lens-fitted photographic film units (hereinafter referred to as film units) are widely used, each of which contains a photographic film cassette and has a simple exposure mechanism and a fixed focus plastic lens, e.g., as disclosed in U.S. Pat. No. 4,884,087, so that anyone may enjoy photographing with ease at low cost. It is desirable to provide a picture frame size changing device in such a film unit.

In a picture frame size changing mechanism used in a conventional compact camera, a pair of light-shielding plates are disposed in a light-shielding box in front of an exposure aperture, so as to be movable into and out of an exposure light path between a panoramic size position and a full size position, respectively. The light-shielding plates are moved by sliding an operation member through an interconnecting mechanism. A toggle spring is provided for reliable positioning of the light-shielding plate in the respective switching positions. That is, the light-shielding plates move to either the panoramic or the full size position under the force of the toggle spring after the operation member is slid by a predetermined amount.

In order to switch over the direction of the biasing of the toggle spring in accordance with the sliding direction of the operation member, it is necessary to provide such a coupling member in the interconnecting mechanism that can push the toggle spring bidirectionally. It is also necessary to engage the coupling member, for example, a fork member with a pin for deforming or bending the toggle spring. However, this known inter connection mechanism could not maintain the light-shielding plates stable in the respective switching positions unless the mechanism is assembled after the light-shielding plates are positioned in one of the switching positions, and then the operation member is positioned in correspondence with the position of the light-shielding member.

The complicated and time consuming assembling process of the known frame size changing mechanism would increase the manufacturing cost. Moreover, the toggle spring needs a relatively large space for movement. Therefore, the conventional picture frame size changing device could not be preferably applied to the film unit which should be compact and inexpensive.

To solve this problem, an improvement has been suggested in U.S. Ser. No. 08/216,953, wherein a helical tension spring biases a pair of light-shielding plates toward the full size position, and the light-shielding plates, an interconnecting mechanism and a finder mask are coupled to one another through one-side contact.

However, because one-side contact coupling involves plays between the coupled members, it can be difficult to accurately position the light-shielding plates in the panoramic position. In that case, a picture frame that is intended to be panoramic size would be larger than the predetermined panoramic size, so that it might be mistaken as a full size picture frame by a film inspector. As a result, the picture frame to be printed in panoramic size would be unexpectedly printed in full size, producing a defective photo-print.

OBJECTS OF THE INVENTION

In view of the foregoing, an object of the present invention is to provide a picture frame size changing device, wherein a pair of light-shielding plates or exposure aperture masking plates are reliably positioned in a predetermined panoramic size position as well as in a full size position.

Another object of the present invention is to provide a film unit having a picture frame size changing device which is compact, inexpensive and easy to assembly.

In view of the nature of the film unit as having a frame size changing function, it is also desirable that the film unit can take such a panoramic size picture frame that results in a photograph worthy of calling panoramic, as well as a full size picture frame that results in a standard photograph that looks as natural as it were viewed with the naked eyes.

SUMMARY OF THE INVENTION

To achieve the above object in a film unit with a picture frame size changing mechanism having upper and lower exposure aperture masking plates and an operation member for switching over the exposure aperture masking plates between a full size position and a panoramic size position, the present invention provides an interconnecting mechanism for interconnecting the operation member to the exposure aperture masking plates, which includes a switching member moving along with the operation member such that the switching member moves to exceed a necessary amount for switching over the exposure aperture masking plates in a direction against the force of an urging member which urges the exposure aperture masking plates toward the full size position (or the panoramic size position). The switching member is engaged with a connecting member for connecting the switching member to the exposure aperture masking plates to move the exposure aperture masking plates conjointly with the switching member. After the exposure aperture masking plates are stopped by a stopper member on the way of movement against the force of the urging member, the excessive movement of the switching member is absorbed by a resilient bending of either the connecting member or the switching member.

In this way, the exposure aperture masking plates are brought into tight contact with the stopper member against the force of the urging member by virtue of the excessive movement of the switching member and the resiliency of the connecting member or the switching member.

According to a preferred embodiment of the invention, the exposure aperture masking plates are pivotally mounted in a light-shielding box which is disposed between an exposure aperture and a taking lens, and the urging member is a spring which is hung on inside portions of the exposure aperture masking plates outside a light path from the taking lens in the light-shielding box.

This embodiment contributes to compactness of the film unit.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 8A is a diagram illustrating a panoramic size position of the picture frame size changing mechanism shown in FIG. 7;

FIG. 8B is a diagram illustrating a full size position of the picture frame size changing mechanism shown in FIG. 7;

DETAILED DESCRIPTION OF THE PREFERRED EMBODIMENT

Figure 1:
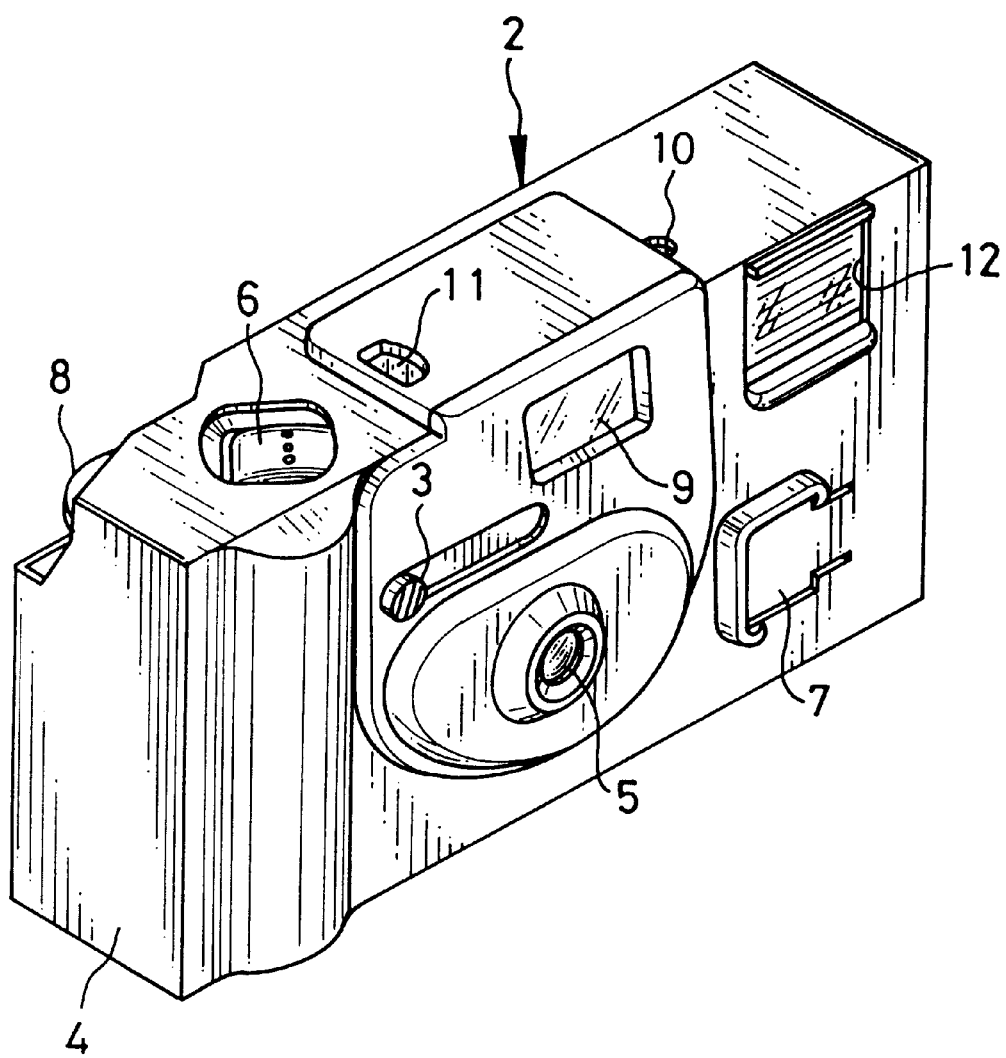
FIG. 1 is a perspective view of a film unit according to a preferred embodiment of the present invention.

A film unit 2 shown in FIG. 1 is capable of photographing a picture frame selectively in a full size (e.g., 24×36 mm, aspect ratio: 1.5) or in a panoramic size (e.g., 13×36 mm, aspect ratio: 2.8), by sliding a knob 3 to one of two corresponding switch positions. The film unit 2 is packed in an outer case 4 having openings or cutouts for exposing the knob 3, a taking lens 5, a shutter button 6, a flash charge switch 7, a film advancing wheel 8, a viewfinder 9, a charge lamp window 10, a frame number window 11, a flash window 12, and so forth to the outside.

Figure 2:
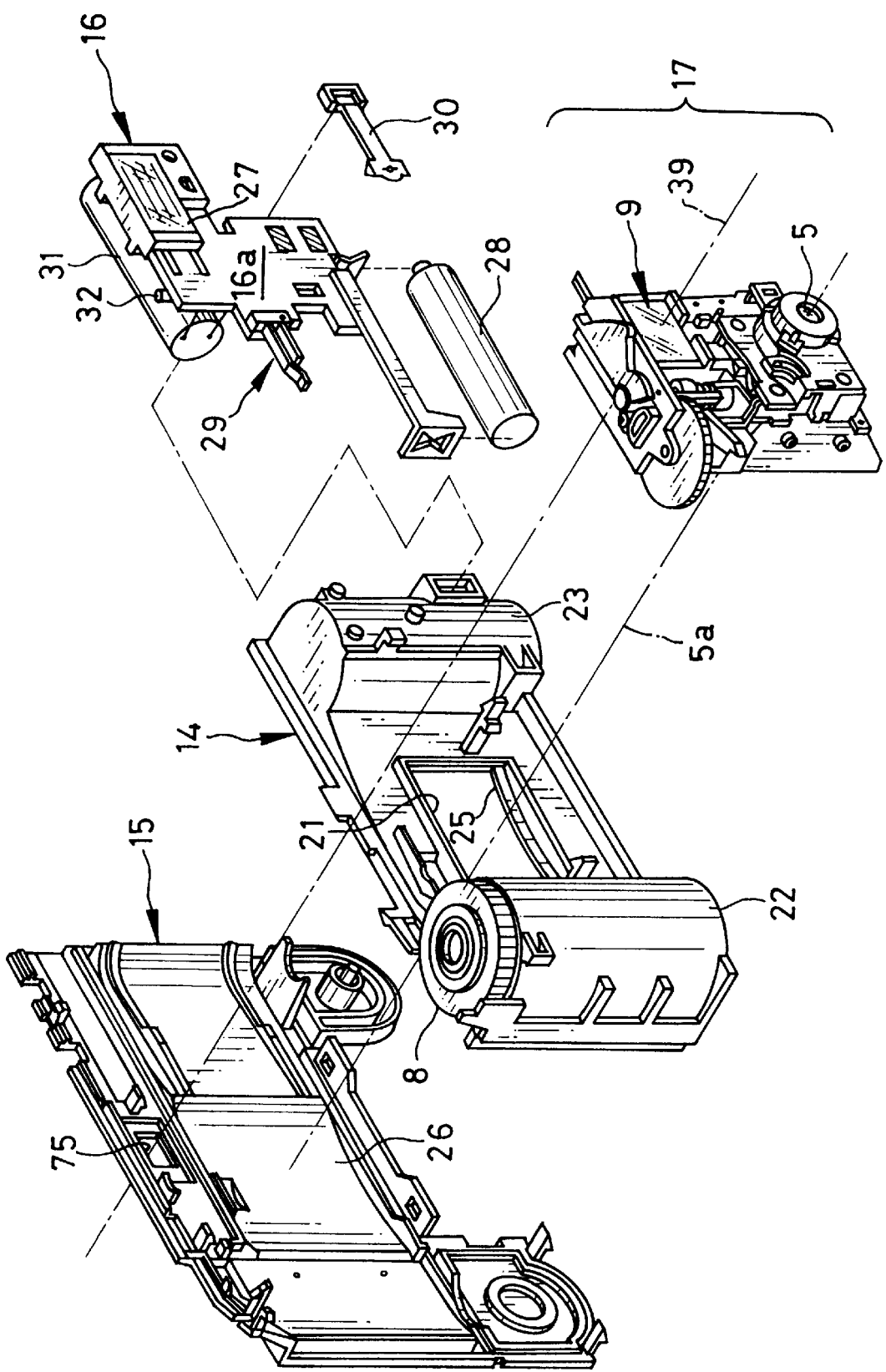
FIG. 2 is an exploded perspective view illustrating a main body section and a rear cover of the film unit shown in FIG. 1.
Figure 3:
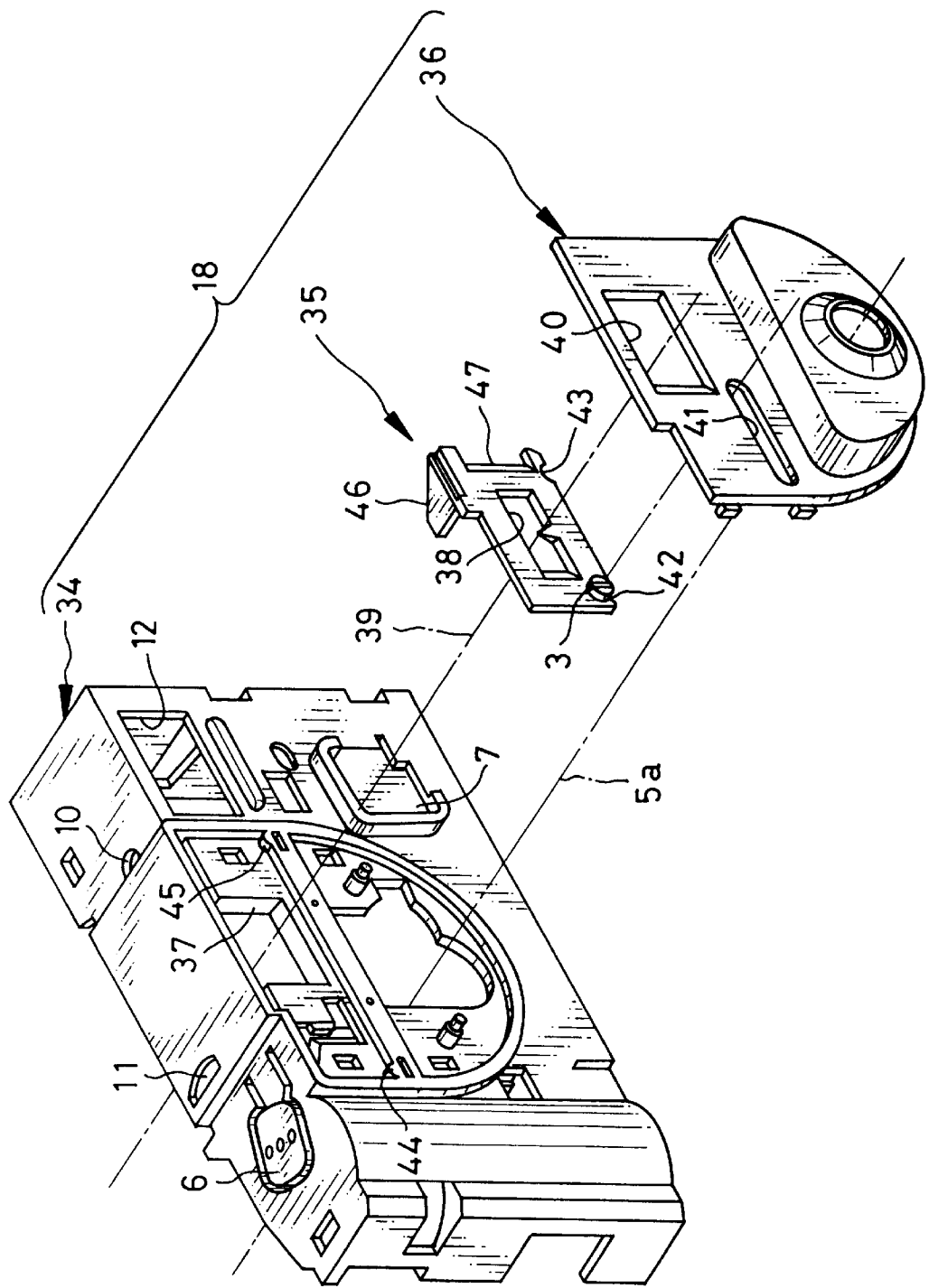
FIG. 3 is an exploded perspective view of a front cover unit of the embodiment shown in FIG. 1.
Figure 4:
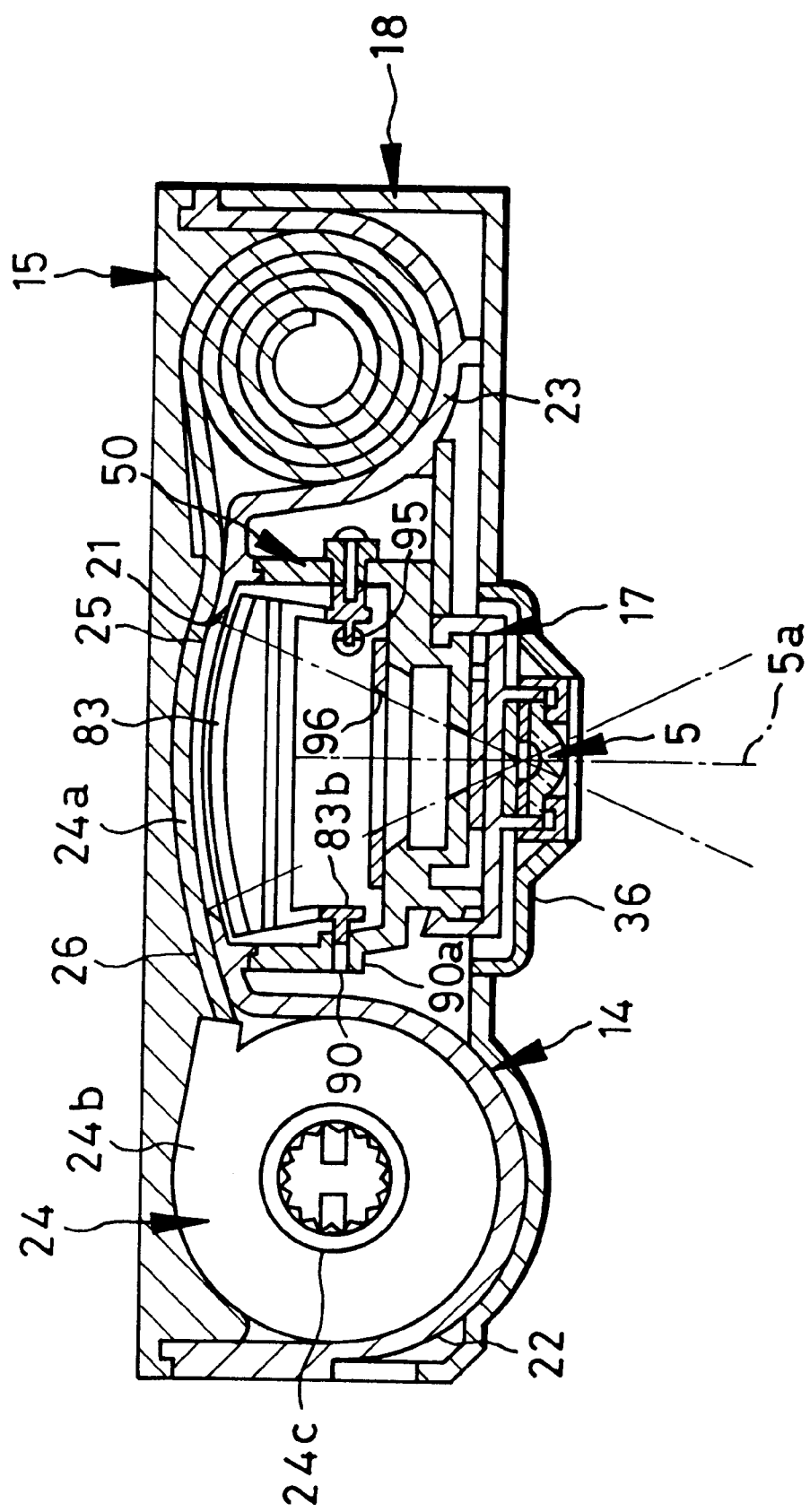
FIG. 4 is a horizontal sectional view of the film unit shown in FIG. 1.

As shown in FIGS. 2 to 4, the film unit 2 is mainly constituted of a main body section 14, a rear cover 15, a flash unit 16, a photograph-taking unit 17 and a front cover unit 18, which are assembled in a fashion suitable for disassembling. In the photograph-taking unit 17, a shutter mechanism including the taking lens 5, and a picture frame size changing mechanism (FIG. 7) are incorporated.

An exposure aperture 21 is formed through the main body section 14, so as to be coaxial with the taking lens 5 when the photograph-taking unit 17 is removably attached to the front of the exposure aperture 21 by claw-hole engagement or the like. A cassette chamber 22 and a film roll chamber 23 are disposed on opposite sides of the exposure aperture 21. An ISO 135-type photographic film cassette 24 loaded in the main body section 14 is shielded from ambient light by the rear cover 15, wherein a roll of unexposed photographic film 24a is initially held in the film roll chamber 23, and a cassette shell 24b of the photographic film cassette 24 is held in the cassette chamber 22.

The exposure aperture 21 has a size equal to a full size picture frame of ISO 135-type film. A film supporting surface 25 formed on the rear side of the main body section 14 surrounding the exposure aperture 21 is rearwardly convex so as to curve the photographic film 24a forwardly concave relative to the film advancing direction. The radius of curvature around the optical axis 5a of the taking lens 5 is for example 100 mm. A film confining surface 26 of the rear cover 15 is also curved complementarily to the curvature of the film supporting surface 25 in a portion behind the exposure aperture 21.

The flash unit 16 has a light emitting portion 27, a printed circuit board 16a, a capacitor 31, a pair of contacts 29 and a charge lamp 32. The capacitor 31 begins to be charged by a battery 28 upon depression of a metal contact plate 30 through the resilient charge switch 7 which is formed integrally with the front cover 18. When the capacitor 31 is fully charged, the charge lamp 32 lights intermittently, and this can be seen through the charge lamp window 10 formed in the top of the front cover 18. The light emitting portion projects light through the flash window 12 in response to a trigger signal which is applied when the contacts 29 is turned on in cooperation with a shutter release.

The front cover unit 18 is constituted of a front cover 34, a panoramic finder mask 35 and a cover panel 36. The front cover 34 has the flash window 12, the shutter button 6, a finder objective window 37, and other elements which are integrally formed therewith, and the panoramic finder mask 35 and the cover panel 36 are attached to the front cover 34. The finder mask 35 has a panoramic window 38 which limits the field of view of the viewfinder 9 to the same aspect ratio as a panoramic size frame. The knob 3 is formed integrally with the finder mask 35. The cover panel 36 has an opening 40 formed coaxially with an optical axis 39 of the viewfinder 9, for defining the full size field of view. The cover panel 36 also has a slot 41 in which the knob 3 is slidably engaged to be exposed to outside.

By sliding the knob 3 along the slot 41, the finder mask 35 is slidable between a panoramic position where the panoramic window 38 is coaxial with the finder optical axis 39, and a full size position where the finder mask 35 is retracted from the field of view of the viewfinder 9. Notches 42 and 43 formed in both ends of the bottom edge of the finder mask 35 are fitted on resilient clicks 44 and 45 formed integrally with the front cover 34, in the full size position and the panoramic position, respectively. The finder mask 35 also has a cam 46 through which the movement of the finder mask 35 is transmitted to the picture frame size changing mechanism. The right edge 47 of the finder mask 35 is cut off so as to minimize the stroke of the finder mask 35 without interfering with the field of view in the full size position.

Figure 5:
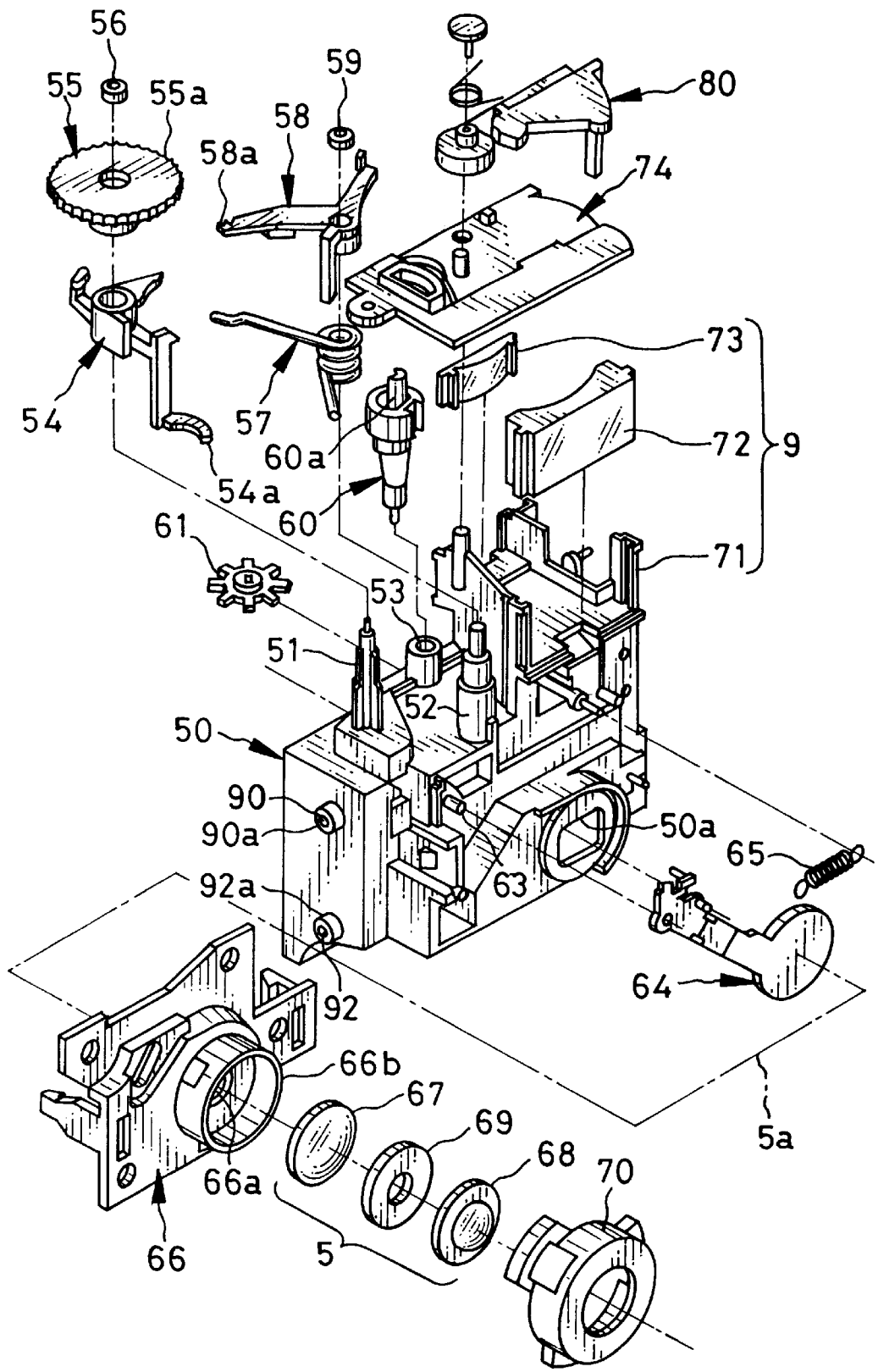
FIG. 5 is an exploded front perspective view of a photograph taking unit of the embodiment shown in FIG. 2.

As shown in FIG. 5, the photograph-taking unit 17 is formed integrally with a light-shielding box 50 for conducting light from the taking lens 5 to the exposure aperture 21 and shielding extraneous light. The light-shielding box 50 is removably secured to the front of the exposure aperture 21 through snap-in engagement or the like. The bottom wall of the light-shielding box 50 is curved complementarily to the contour of the cylindrical battery 28 disposed therebelow. The light-shielding box 50 has front and rear openings 50a and 50b for the passage to the photographic film 24a of the exposure light entering through the taking lens 5. The rear opening 50b is aligned with the exposure aperture 21.

On the top of the light-shielding box 50, two axles 51 and 52 and a bearing sleeve 53 are integrally formed therewith. A shutter actuating lever 54 and a frame counter dial 55 are rotatably fitted on the axle 51, and a snap ring 56 retains them on the axle 51. A coiled spring 57 and an arresting lever 58 are rotatably fitted on the axle 52, and a snap ring 59 secures the spring 57 and the arresting lever 58 to the axle 52.

The bearing sleeve 53 receives a cam unit 60 which has a one-tooth gear 60a disposed on the top of the cam unit 60. The bottom tip of the cam unit 60 is coaxially coupled to a sprocket wheel 61. The sprocket wheel 61 engages with perforations of the photographic film 24a and makes one revolution while the photographic film 24a is advanced one frame by rotating a spool 24c of the film cassette 24 through the film advancing wheel 8. When the sprocket wheel 61 is rotated along with the film advance, the cam unit 60 is rotated together and causes the shutter actuating lever 54 to move in a cocked position through the arresting lever 58. Simultaneously, a claw 58a of the arresting lever 58 is engaged with one of grooves formed around the periphery of the film advancing wheel 8. One revolution of the cam unit 60 also causes the frame counter dial 55 to rotate by one unit through the one-tooth gear 60a.

Upon depression of the shutter button 6, the shutter actuating lever 54 rotates counterclockwise about the axle 51 under the force of the spring 57, to strike a shutter blade 64 at a distal end 54a of the shutter actuating lever 54. The shutter blade 64 is of a crank-shape and is pivotally mounted on an axle 63 which is integrally formed on the front of the light-shielding box 50 parallel to the optical axis 5a of the taking lens 5. The shutter blade 64 is urged by a spring 65 to a closed position to close an opening 50a formed coaxially with the optical axis 5a in the light-shielding box 50, and is swung to an open position to open the opening 50a when struck by the shutter actuating lever 54.

A shutter cover 66 is mounted in front of the shutter blade 64 to prevent the shutter blade 64 from fluttering in the direction of the optical axis 5a. The shutter cover 66 has a stop aperture 66a and a lens barrel 66b around the stop aperture 66a, which are integrally formed as one body. After the taking lens 5 consisting of rear and front lens elements 67 and 68 and a spacer 69 inserted between these lens elements 67 and 68 is mounted in the lens barrel 66b, a lens cover 70 is fitted on the lens barrel 66b.

Figure 6:
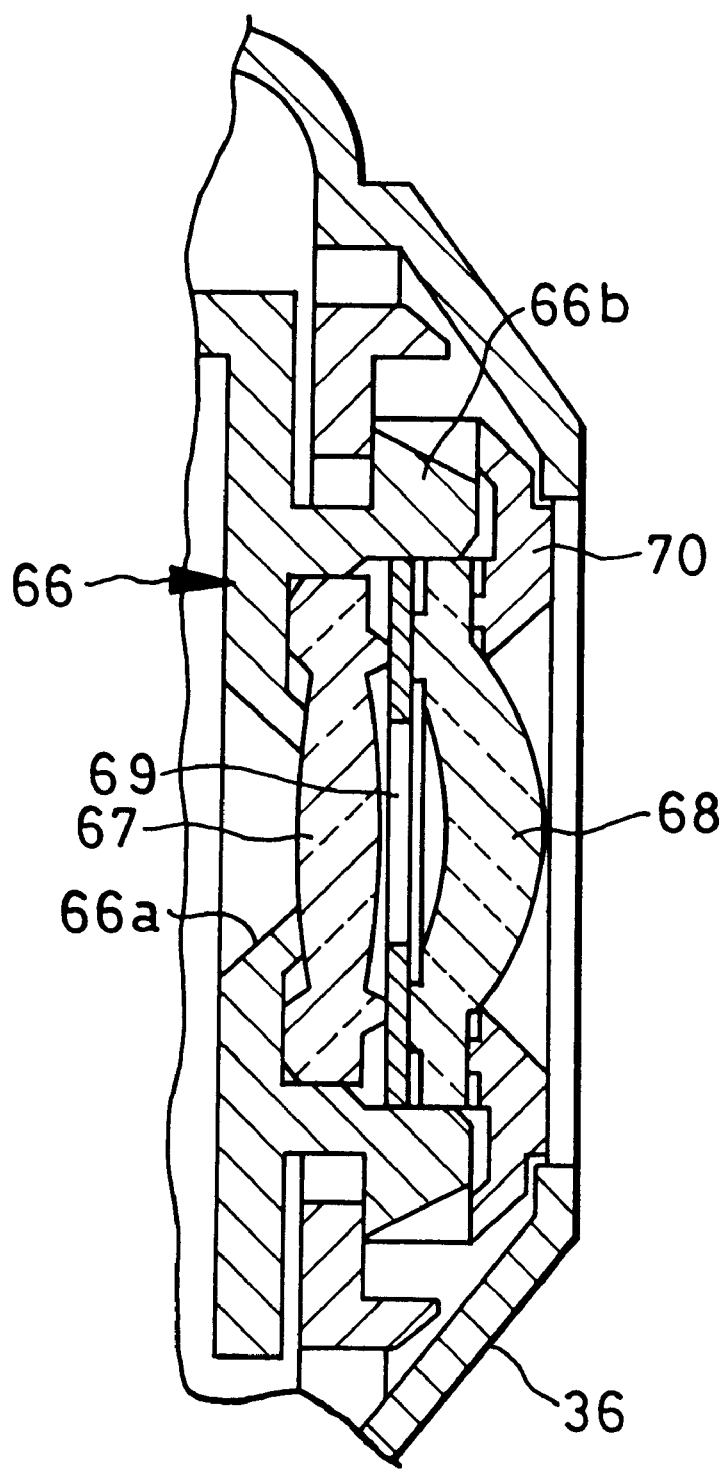
FIG. 6 is an enlarged sectional view of the taking lens shown in FIG. 5.

The rear lens element 67 is preferably a biconvex spherical plastic lens, and the front lens element 68 is preferably a convex meniscus plastic lens having an aspherical front surface, as shown in FIG. 6. Although a conventional panoramic film unit produced by Fuji Photo Film Co., Ltd. has a taking lens whose focal length is designed to be 25 mm especially for a wide angle panoramic photographic field, the taking lens 5 of the film unit of the present invention is designed to have a focal length of 32 mm and an f-number of 10.5, because the film unit of the present invention is changeable between full size and panoramic size photography. Thereby, a wide angle effect is achieved in the panoramic size photography, while a full size view is provided in the full size photography.

The reason why the taking lens 5 should have such a large f-number is to make the taking lens 5 pan-focus without the need for focusing. The focal length F of the taking lens for a film unit whose exposure aperture size is changeable between the panoramic size and the full size is preferably not less than 28 mm and not more than 33 mm. It is possible to constitute the taking lens of a single lens element, wherein the single lens element is an aspherical lens having aspherical opposite surfaces.

In this way, a photo-print made from a panoramic size picture frame taken in the film unit 2 looks like a real panoramic photograph, while a full size photo-print obtained through the film unit 2 looks natural like as a scene viewed with the naked eyes.

A channel-shape finder lens frame 71 for removably receiving objective lens 72 and eyepiece 73 of the viewfinder 9, an inverted Galilean viewfinder in this instance, is integrally formed on an upper portion of the light-shielding box 50. A finder lens holding plate 74 is removably mounted on the top of the finder lens frame 71 to hold the lenses 72 and 73. These lenses 72 and 73 are disposed between the finder objective window 37 of the front cover 34 and an eyepiece window 75 which is formed in the rear cover 15.

Figure 7:
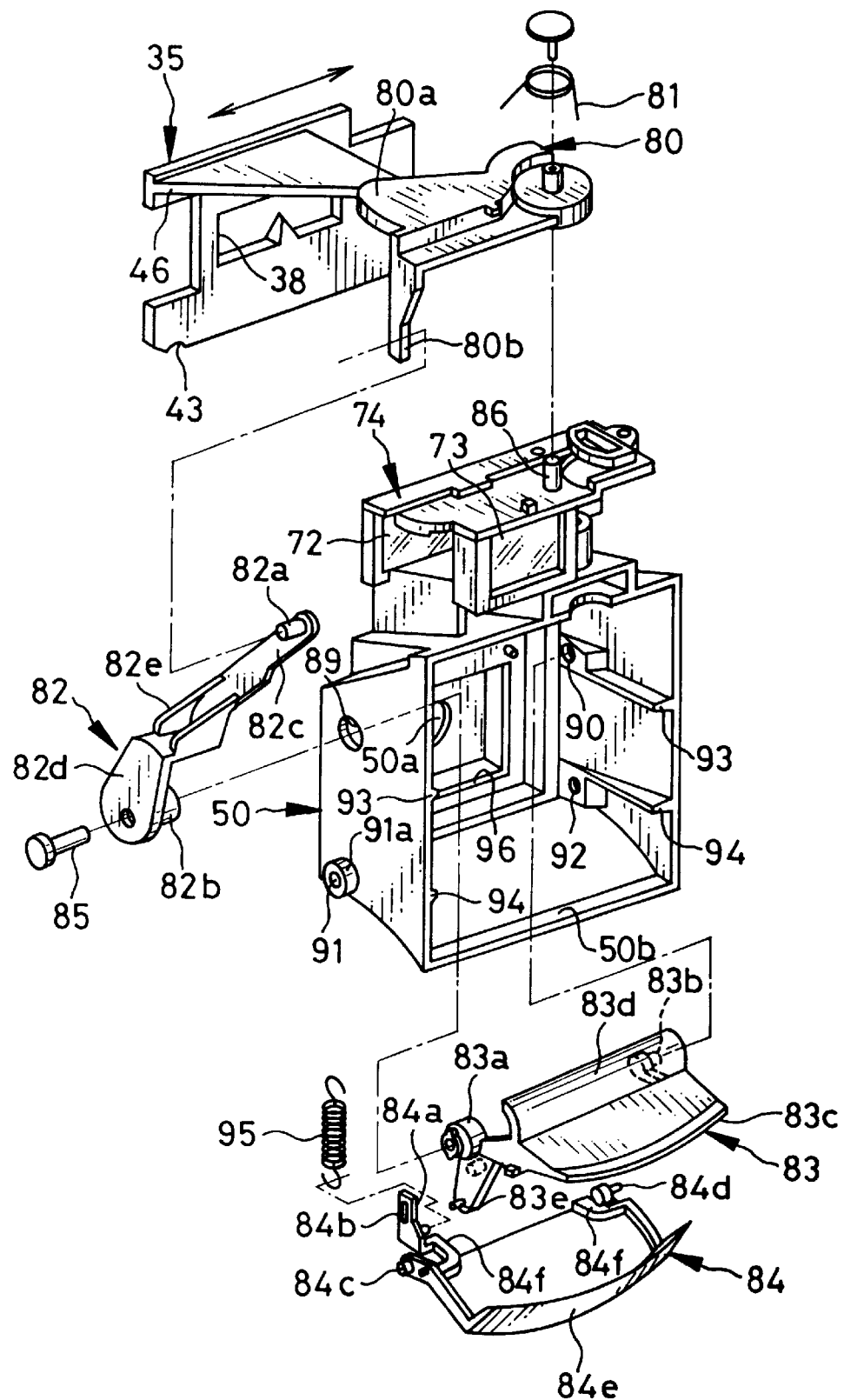
FIG. 7 is an exploded rear perspective view of a photograph taking unit of the embodiment shown in FIG. 2.

Referring to FIG. 7, the picture frame size changing mechanism is mainly comprised by a switching lever 80, a spring 81, a crank lever 82, upper and lower aperture masking plates 83 and 84 and a helical tension spring 95 suspended between these aperture masking plates 83 and 84. The switching lever 80 is pivotal about an axle 86 which is provided on the top surface of the finder lens holding plate 74. The switching lever 80 has a projection 80a which may slide on the cam 46 of the finder mask 35. The spring 81 urges the switching lever 80 to rotate in a direction to contact the projection 80a with the cam 46, that is, the clockwise direction in FIG. 7. The switching lever 80 also has an arm 80b projecting downward. The arm 80b is brought into contact at its one side on a pin 82a formed at an upper end portion 82c of the crank lever 82, while the switching lever 80 is rotated by the panoramic finder mask 35 moving from the full size position to the panoramic size position. The switching lever 80 is made of hard plastic, whereas the crank lever 82 is made of resilient plastic. The crank lever 82 is provided with a bearing portion 82b at a lower end thereof. The bearing portion 82b pivotally bears the upper aperture masking plate 83 through a bearing hole 89 of the light-shielding box 50. The bearing portion 82b is fixedly coupled to the upper aperture masking plate 83 by a force fit pin 85. Accordingly, the upper aperture masking plate 83 swings together and coaxially with the crank lever 82.

A second bearing hole 90 for bearing the upper aperture masking plate 83 is formed on the side of the light-shielding box 50 opposite the bearing hole 89 so as to allow pivoting of the upper aperture masking plate 83. Another pair of bearing holes 91 and 92 are formed correspondingly below the bearing holes 89 and 90, for bearing the lower aperture masking plate 84. Annular bosses 90a, 91a and 92a are respectively formed around the bearing holes 90, 91 and 92 on the outside wall of the light-shielding box 50 (see FIG. 5), so as to reliably shield extraneous light from entering through the bearing holes 90 to 92. Two pairs of stops 93 and 94 are formed integrally on the inside of the side walls of the light-shielding box 50 in those positions corresponding to the bearing holes 90 to 92, so as to stop the aperture masking plates 83 and 84 in their panoramic position as shown in FIG. 8A.

The upper aperture masking plate 83 is made of resilient plastic and has a pair of pivots 83a and 83b on opposite horizontal sides of its front end portion. A rear edge 83c of the upper aperture masking plate 83 has a curve which is complementary to the curvature of the film supporting surface 25. A gap is formed between the pivots 83a and 83b so that the pivots 83a and 83b can be snapped in the bearing holes 89 and 90 by resiliently inwardly deforming the upper aperture masking plate 83. A blocking wall 83d for blocking light entering through the gap is formed between the gap and the rear edge 83c. The upper masking plate 83 has a pin 83e for transmitting the motion of the crank lever 82 to the lower masking plate 84. The tension spring 95 biases the upper and lower masking plate 83 and 84 in a direction to contact an arm 84a of the lower masking plate 84 with the pin 83e, that is, the direction toward their full size position as shown FIG. 8B.

According to the present invention, the switching lever 80 is formed such that, when the panoramic finder mask 35 is slid from the full size position to the panoramic position, the cam 46 causes the switching lever 80 to move by a larger amount than it is necessary for moving the upper and lower aperture masking plates 83 and 84 from the full size position to the panoramic size position. The upper or distal end portion 82c of the crank lever 82 is made slimmer than the other portion of the crank lever 82 so as to be resiliently bent to absorb the over-stroke of the switching lever 80 beyond the necessary range of movement of the aperture masking plates 83 and 84, as is indicated by phantom lines in FIG. 8A. A pair of ribs 82e are formed below the distal end portion 82c for reinforcing the crank lever 82.

The lower masking plate 84 is made of resilient plastic, and has a pair of pivots 84c and 84d on opposite horizontal sides of its front end portions. A cut-out is formed behind either pivot 84c, 84d so that the pivots 84c and 84d can be snapped in the bearing holes 91 and 92. According to this construction, the lower masking plate 84 can pivotally move in cooperation with the upper masking plate 83 between the full size position shown in FIG. 8B and the panoramic position shown in FIG. 8A, where the masking plates 83 and 84 are inserted into the exposure light path. A slot 84b is formed through the arm 84a of the lower masking plate 84 so as to receive pressure transmitted from the pin 83e to the arm 84a.

A light-trapping frame 96 for preventing flare effect in the full size position of the aperture masking plates 83 and 84 is mounted inside the light-shielding box 50. Because the tension spring 95 is disposed out of the light path from the light-trapping frame 96 to the exposure aperture 21, as is shown in FIG. 4, the light-shielding box 50 can still be compact.

The lower aperture masking plate 84 is curved correspondingly to the bottom wall of the light-shielding box 50 for reliably preventing internal reflection. The lower aperture masking plate 84 has a flange 84e which extends perpendicularly upwardly from the main portion of the masking plate 84, and is curved correspondingly to the film supporting surface 25. Blocking walls 84f are formed to cover the cut-outs behind the pivots 84c and 84d for blocking extraneous light entering through the cut-outs. It is to be noted that the exposure mechanism are omitted from FIG. 7, for clarity.

The operation of the above-described film unit 2 are as follows:

The film unit 2 is set in the panoramic position before packed in a moisture proof envelop in the factory. Since the amount of movement of the switching lever 80 that is caused by the cam 46 is larger than the necessary amount for moving the aperture masking plate 83 and 84 between the full- and panoramic size positions, the distal end portion 82c of the crank lever 82 is resiliently bent to absorb the plays between the respective elements of the picture frame size changing mechanism. Accordingly, the upper aperture masking plates 83 is brought into tight contact with the stopper 93. Moreover, in the panoramic size position, since the arm 84a is pushed by the pin 83e of the upper aperture masking plate 83 in a direction to rotate the lower aperture masking plate 84 farther in the clockwise direction in FIG. 8A, also the lower aperture masking plate 84 is brought into tight contact with the stopper 94, while the excessive movement of the lower aperture masking plate 84 is absorbed by the resiliency of the arm 84a and the slit 84e. In this way, the film 2 is stably set in the panoramic position.

To get ready to photograph, the film advancing wheel 8 is rotated to advance the photographic film 24a. When the photographic film 24a has been advanced one frame amount, the shutter actuating lever 54 is held in the cocked position. Simultaneously, the film advancing wheel 8 is locked, and the one-tooth gear 60a advances the frame counter dial 55 one unit.

After cocking the shutter actuating lever by rotating the film advancing wheel, the photographer may depress the charge switch 7 while framing a photographic field through the viewfinder 9, so as to charge the main capacitor 31 of the flash unit 16 to a high voltage with the battery 28. When the main capacitor 31 has been charged up to the high voltage, the charge lamp 32 starts emitting intermittently, so that the photographer can confirm the completion of charging during the framing.

The film unit 2 is initially set in the panoramic position. Therefore, the field of view of the viewfinder 9 is defined by the panoramic window 38, so that the photographer can frame the photographic field in the panoramic size. When the shutter button 6 is depressed in the panoramic position, the shutter blade 64 swings to open and then close the stop aperture 66a. Concurrently, the shutter blade 64 turns the contacts 29 on to cause the flash unit 16 to project light from the light emitting portion 27 toward a subject. The upper and lower aperture masking plates 83 and 84 cut off upper and lower parts of the light entering through the taking lens 5, so that a panoramic size picture frame is recorded on the film 24a.

For taking a full size picture frame, the knob 3 is slid to the left of FIG. 3, that is, to the right of FIG. 7, disengaging the notch 43 of the finder mask 35 from the click 45 of the front cover 34. After the notch 43 is disengaged from the click 45, the finder mask 35 smoothly moves to the right of FIG. 7 under the force of the spring 81 which urges the switching lever 80 to rotate in the clockwise direction. The finder mask 35 and thus the picture frame size changing mechanism is arrested in the full size position by fitting the notch 42 on the click 44. At that time, the photographer is informed by the click that the film unit 2 is switched to the full size position.

The clockwise rotation of the switching lever 80 under the force of the spring 81 causes the crank lever 82 to rotate about the bearing portion 82b in the counterclockwise direction, so that the upper aperture masking plate 83 moves about the pivots 83a and 83b in the counterclockwise direction. By virtue of the spring 95, the lower aperture masking plate 95 is rotated about the pivots 84c and 84d in the clockwise direction. In this way, the upper and lower aperture masking plates 83 and 84 are set in the full size position as shown in FIG. 8B.

After switching the film unit 2 to the full size position by sliding the knob 3 as described above, the field of view of the viewfinder 9 is defined by the opening 40 of the cover panel 36 to correspond to the full size defined by the exposure aperture 21. In this position, a full size picture frame is recorded on the photographic film 24a upon depression of the shutter button 6, in the same way as above.

Photographing continues thereafter by setting the knob 3 to either the full size or the panoramic position. After all available frames have been photographed, the film unit 2 containing the exposed photographic film 24a is forwarded to a photo-lab. At the photo-lab, the photographic film cassette 24 is removed from the film unit 2. If a depiction is printed on the cassette shell 24*b* indicating that the photographic film 24*a* includes both full size frames and panoramic size frames, this cassette 24 can be easily grouped with others that should be subjected to the following special process.

After this grouping, the photographic film 24*a* is pulled out of the cassette shell 24*b*, and is developed and inspected. At the time of this film inspection, a notch is provided to each full size frame in order to discriminate between full size and panoramic size frames. Because the panoramic size picture frames are about 13×36 mm, having a less height than the full size picture frame, they are easy to detect. The photographic film 24*a* after inspected is set in a scanner, which first scans images of merely the full size picture frames marked with the notches, and calculates an exposure correction value for each full size picture frame. The data of exposure correction values is written in a memory card along with the associated frame numbers. Thereafter, the photographic film 24*a* and the corresponding memory card is set in a printer-processor to continuously make photo-prints of 89×127 mm size from the full size picture frames with reference to the exposure correction value.

Next, the photographic film 24*a* is again set in the scanner, which then picks up image of merely the panoramic picture frames to calculate exposure correction values for the respective panoramic size picture frames, and records exposure correction data in the memory card. Then, photo-prints of 89×254 mm size are continuously made from the panoramic size picture frames by the printer-processor, after the format of photographic paper and the size of paper mask are changed correspondingly. The print magnification for the full size picture frame is about 3.5, whereas that for the panoramic size picture frame is about 7. The resulting photo-prints and the developed photographic film 24*a* are forwarded back to the customer, and the film unit 2 containing no photographic film is recovered for recycling.

Although the excessive movement or over-stroke of the switching lever 80 is absorbed by resilient bending of the crank lever 82 in the above-described embodiment, it is instead possible to give resiliency to the arm 80*b* of the switching lever 80 for absorbing the excessive movement.

Figure 9:
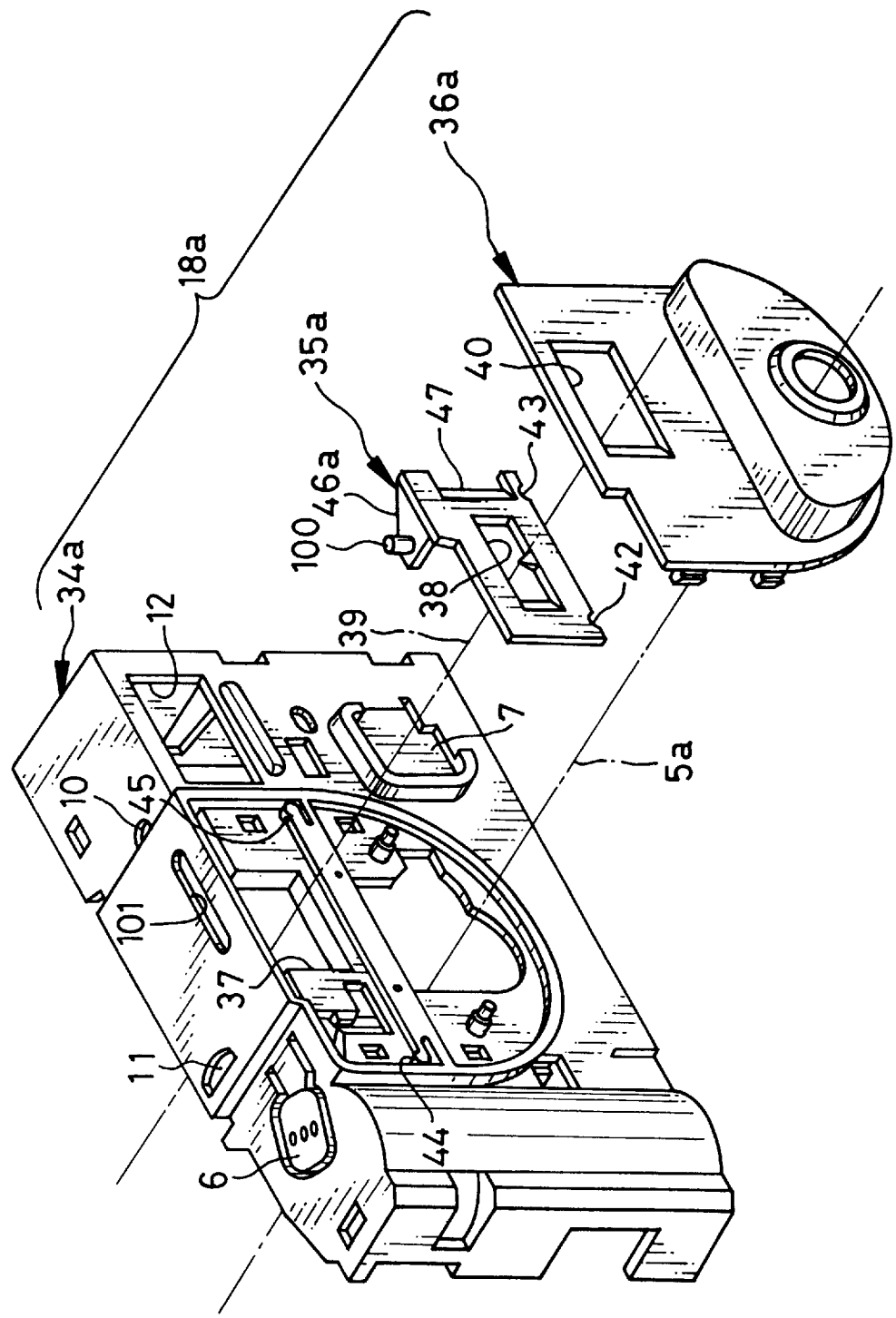
FIG. 9 is an exploded perspective view of a front cover unit according to another preferred embodiment of the present invention.
Figure 10:
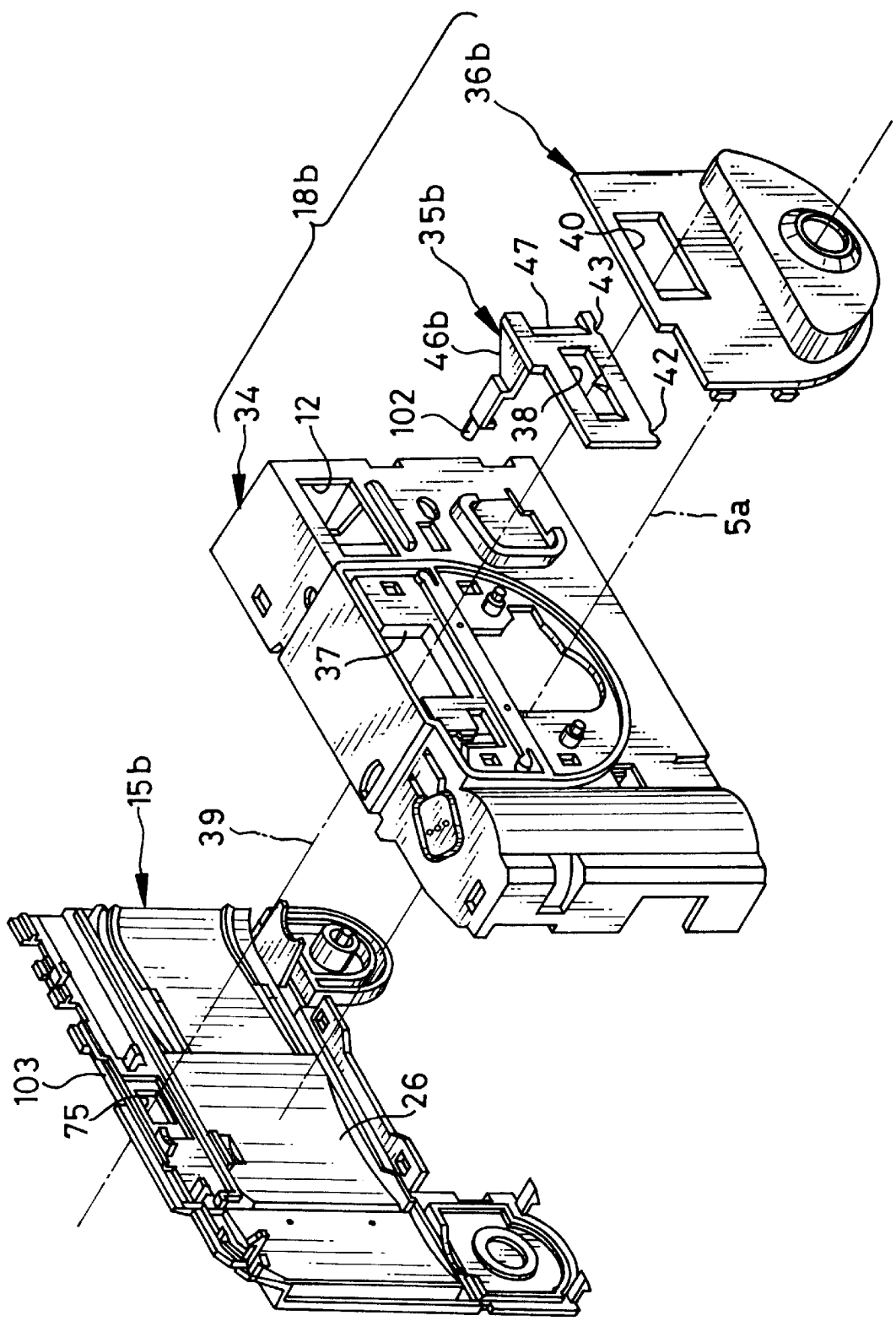
FIG. 10 is an exploded perspective view of a front cover unit according to a further preferred embodiment of the present invention.

Although the knob 3 for sliding the finder mask 35 is formed on the front of the finder mask 35 in the above embodiment, it is also possible to dispose such a knob 100 on a top surface of a cam 46*a* of a finder mask 35*a*, as is shown in FIG. 9. In this embodiment, a slot 101 for exposing the knob 100 to the outside is formed through a top wall of a front cover 34*a*, rather than in a front panel 36*a*. As shown in FIG. 10, a knob 102 for operating a finder mask 35*b* may be formed on a rear end of a cam 46*b* of the finder mask 35*b*, so as to be exposed to the outside through a cut-out 103 formed through a rear cover 15*b* of a film unit above an eyepiece window 75 of a viewfinder. Also in this embodiment, a front panel 36*b* has no slot for the knob 102. Other elements of these variations may be equivalent to the embodiment shown in FIGS. 1 to 8, so that they are designated by the same reference numerals and detailed description thereof is omitted for brevity.

Instead of urging the exposure aperture masking plates toward the full size position, it may be possible to urge them toward the panoramic position, for example, by a compression spring. In this alternative, the switching lever should be over-moved in a direction to contact the masking plates against the top and bottom walls of the light-shielding box to maintain the masking plates stable in the full size position.

While the present invention has been described with reference to preferred embodiments shown in the drawings, the present invention is not limited by the embodiments. The picture frame size changing mechanism according to the invention may be preferably applicable to a compact camera as well as a film unit. Thus, various modifications of the present invention can be effected without departing from the scope and spirit of the appended claims.

What is claimed is:

1. In a lens-fitted photographic film unit having a pre-loaded photographic film, a taking lens, an exposure aperture and an exposure mechanism for exposing said photographic film, said lens-fitted photographic film unit comprising:

upper and lower exposure aperture masking plates movable in front of said exposure aperture between a full size position outside a light path from said taking lens to define a picture frame in a full size of said exposure aperture, and a panoramic size position wherein said exposure aperture masking plates are inserted in said light path to mask out upper and lower portions of said exposure aperture to define a panoramic size picture frame;

an urging member for urging said exposure aperture masking plates toward a first one of said full size and said panoramic size positions;

stopper members for positioning said exposure aperture masking plates in a second one of said full size and said panoramic positions;

an operation member manually moved to select one of said full size and said panoramic size positions; and an interconnecting mechanism cooperating with said operation member to switch over said exposure aperture masking plates conjointly with said operation member;

the improvement wherein said interconnecting mechanism comprises a switching member moving conjointly with said operation member such that said switching member moves by an excessive amount after bringing said exposure aperture masking plates into contact with said stopper members against the force of said urging member, and a connecting member connecting said switching member to said exposure aperture masking plates to switch over said exposure aperture masking plates conjointly with said switching member, and wherein either said connecting member or said switching member has a resilient portion for absorbing the excessive movement of said switching member after said exposure aperture masking plates are stopped against said stopper members.

2. A lens-fitted photographic film unit as recited in claim 1, further comprising an arresting member for arresting said operation member and said exposure aperture masking plates in said second one of said full size and said panoramic size positions against the force of said urging member.

3. A lens-fitted photographic film unit as recited in claim 2, wherein said exposure aperture masking plates are pivotally mounted in a light-shielding box which is disposed between said exposure aperture and said taking lens, and said urging member is a spring which is hung on inside portions of said exposure aperture masking plates so as to be disposed outside said light path.

4. A lens-fitted photographic film unit as recited in claim 3, wherein said exposure aperture masking plates have resilient arms extending toward each other which are directly interconnected through one-side contact for conjoint movement of said exposure aperture masking plates in opposite directions.

5. A lens-fitted photographic film unit as recited in claim 4, wherein said arm of said lower exposure aperture masking plate has a slot for absorbing pressure applied from said upper exposure aperture masking plate.

6. A lens-fitted photographic film unit as recited in claim 4, wherein said connecting member is a lever disposed on one side of said light-shielding box, said lever having a bearing portion at its lower end which is fixedly and coaxially coupled to said upper exposure aperture masking plate through a hole formed through said light-shielding box, so as to be pivotal about a same axis.

7. A lens-fitted photographic film unit as recited in claim 6, wherein said lever is connected at a distal end thereof to said switching member through one-side contact, and said distal end is made slimmer than the other portions of said lever to provide said resilient portion for absorbing the excessive movement of said switching member.

8. A lens-fitted photographic film unit as recited in claim 2, further comprising a finder mask member movable in front of an objective window of a viewfinder of said film unit having a first field of view which corresponds to said full size picture frame, to provide a second field of view which corresponds to said panoramic size picture frame.

9. A lens-fitted photographic film unit as recited in claim 8, wherein said operation member is formed integrally with said finder mask member.

10. A lens-fitted photographic film unit as recited in claim 9, said finder mask member is slidable in horizontal directions on a front cover of said film unit covering the front and top of said film unit and having said objective window of said viewfinder, a front panel is attached to the front of said finder mask member to slidably hold said finder mask member, and said finder mask member is engaged with said switching member through a cam protruding rearward from said finder mask member.

11. A lens-fitted photographic film unit as recited in claim 10, wherein said arresting member for arresting said operation member and said exposure aperture masking plates in said second position comprises a notch formed on a bottom portion of said finder mask and a click formed on said front cover for catching said notch thereon.

12. A lens-fitted photographic film unit as recited in claim 10, wherein said operation member comprises a knob formed on a front surface of said finder mask member and exposed to the outside through a slot formed through said front panel.

13. A lens-fitted photographic film unit as recited in claim 10, wherein said operation member comprises a knob formed on a top surface of said cam, and said knob is exposed to the outside through a slot formed on a top wall portion of said front cover.

14. A lens-fitted photographic film unit as recited in claim 10, wherein said operation member is a knob formed on a rear end of said cam, and said knob is exposed to the outside through a cut-out formed in a rear wall of said film unit.

15. A lens-fitted photographic film unit as recited in claim 1, wherein said taking lens has a fixed focal length of not less than 28 mm and not more than 32 mm.

16. In a lens-fitted photographic film unit having a preloaded photographic film, a taking lens, an exposure aperture and an exposure mechanism for exposing said photographic film, said lens-fitted photographic film unit comprising:

upper and lower exposure aperture masking plates movable in front of said exposure aperture between a full size position outside a light path from said taking lens to define a picture frame in a full size of said exposure aperture, and a panoramic size position wherein said exposure aperture masking plates are inserted in said light path to mask out upper and lower portions of said exposure aperture to define a panoramic size picture frame;

switching means for moving both of said exposure aperture masking plates simultaneously and selectively toward either said full size or said panoramic size position;

stopper members for positioning said exposure aperture masking plates in said panoramic positions;

the improvement wherein said switching means are movable beyond a position of said switching means in which said exposure aperture plates first contact said stopper members, and wherein said switching means has a resilient portion for absorbing the excessive movement of said switching means after said exposure aperture masking plates are stopped against said stopper members.

* * * * *